United States Patent [19]

Kawashima et al.

[11] Patent Number: 4,904,230
[45] Date of Patent: Feb. 27, 1990

[54] BELT AUTOTENSIONER

[75] Inventors: Kazuki Kawashima; Hisashi Hayakawa, both of Iwata, Japan

[73] Assignee: NTN Toyo Bearing Co., Ltd., Osaka, Japan

[21] Appl. No.: 382,938

[22] Filed: Jul. 21, 1989

[51] Int. Cl.$^4$ .............................................. F16H 7/12
[52] U.S. Cl. ..................................... 474/112; 474/135
[58] Field of Search .................... 474/101, 109–117, 474/133, 135, 136, 138

[56] References Cited

U.S. PATENT DOCUMENTS

| | | | |
|---|---|---|---|
| 4,504,252 | 3/1985 | Honma | 474/112 |
| 4,634,407 | 1/1987 | Holtz | 474/112 |
| 4,832,665 | 5/1989 | Kadota et al. | 474/112 |
| 4,838,839 | 6/1989 | Watanabe et al. | 474/135 |

Primary Examiner—Thuy M. Bui
Attorney, Agent, or Firm—Armstrong, Nikaido, Marmelstein, Kubovcik & Murray

[57] ABSTRACT

A belt autotensioner for giving a desired tension to a belt. It includes a tension pulley pressed against the belt, an eccentric shaft extending through the tension pulley to rotatably support it and formed with a hole arranged eccentrically from the axis of the tension pulley, an actuator having a cylinder and a push rod silidably mounted in the cylinder and having its one end protruding from the cylinder and butting a projection fixed to the eccentric shaft, a bolt extending through the hole in the eccentric shaft and the cylinder of the actuator to pivotally support the eccentric shaft and a spring for biasing the eccentric shaft to pivot it in such a direction as to increase the tension of the belt. The spring may be a torsion coil spring mounted around the eccentric shaft with its one end fixed to the outer periphery of the eccentric shaft and the other end fixed to the cylinder of the actuator.

2 Claims, 6 Drawing Sheets

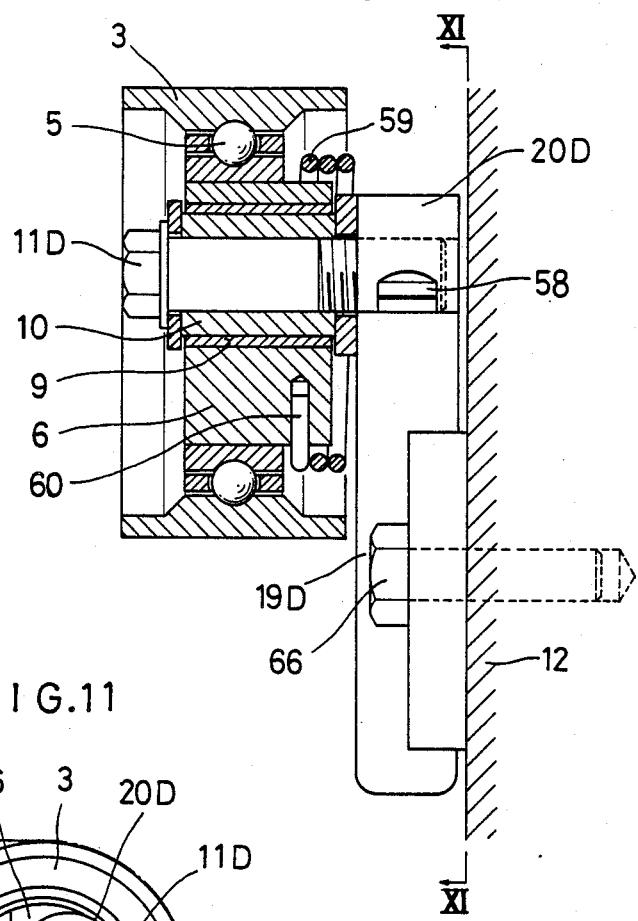
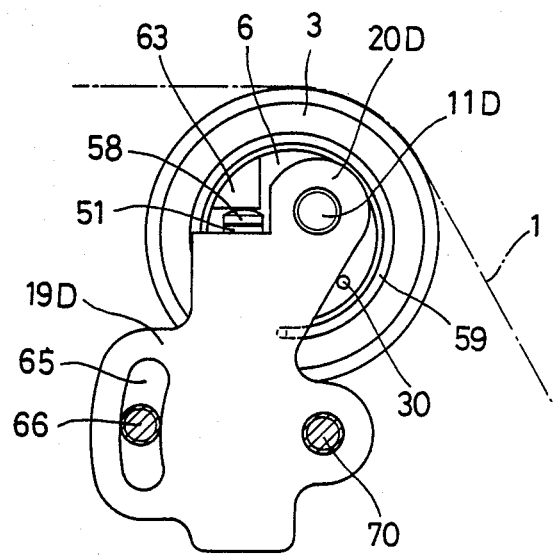

BELT AUTOTENSIONER

The present invention relates to a belt autotensioner for a power transmission belt for use with an engine, and more specifically an autotensioner for controlling the tension of a toothed timing belt for transmitting the power from a crankshaft of an automotive engine.

With a power transmission belt mounted in an automotive engine, its tension tends to fluctuate with the change of distance between the axes of any adjacent pulleys owing to a thermal expansion of the engine body or with the fluctuation of torque. To keep constant the tension of such a belt, an autotensioner is generally used to apply a suitable tension to the belt through a tension pulley kept in contact with the belt.

One of such prior art autotensioners is shown in FIG. 12 by way of example (which is disclosed in Japanese Unexamined Utility Model Publication 63-18663). This autotensioner comprises a support shaft 83, a bracket 82 pivotally mounted on the support shaft 83, a tension pulley 81 rotatably mounted on the bracket 82 through a bearing (not shown), a tension control spring 86 held in engagement with the tension pulley 81 to urge it against a belt 80 and thus to apply tension to the belt, and a damper cylinder 84 having its mounting portion 85 fixed to the support shaft 83.

The bracket 82 has an abutment 88 adapted to contact a rod 87 slidably mounted in the damper cylinder 84 and a stopper 89 adapted to abut the top end of the damper cylinder 84. The damper cylinder is fixedly mounted on the body of an engine by means of the support shaft 83 put through the mounting portion 85 and a fixing bolt 91 put through a hole 92 formed in a mounting portion 90 provided at the rear bottom end of the damper cylinder 84.

The hole 92 is elongaged so that the damper cylinder 84 can be set to a desired position by moving it about the support shaft 83 before tightening the bolt 91. The pivotal movement of the damper cylinder 84 about the support shaft 83 is restricted by the stopper 89 provided opposite to the top end of the cylinder 84.

With such a prior art autotensioner, no means is provided to adjust the force of the spring to the belt according to any inconsistency in the length of the belt resulting from manufacturing errors. Further, because the bracket, damper cylinder and tension control spring are all separate parts, the assembly takes not only a long time but also a large space.

It is an object of the present invention to provide an autotensioner which obviates the abovesaid shortcomings and which is compact and inexpensive.

In accordance with the present invention, there is provided a belt autotensioner for imparting a desired tension of a belt, comprising a rolling bearing including an outer ring in the form of a tension pulley adapted to be pressed against the belt, an inner ring rotatably mounted in the outer ring and a plurality of rolling elements interposed between the outer ring and the inner ring, an eccentric shaft fixedly mounted in the inner ring and formed with a hole arranged eccentrically with respect to the axis of the rolling bearing, a stopper fixedly mounted on one end face of the eccentric shaft, a direct acting actuator for dampening the pivotal motion of the eccentric shaft when the tension of the belt is increasing, the actuator having a damper cylinder and an urging means slidably mounted therein, the urging means having one end thereof protruding from the cylinder and in abutment with the stopper, a bolt means extending through the hole in the eccentric shaft and the actuator so as to pivotally support the eccentric shaft, and a spring means for biasing the eccentric shaft to pivot it in such a direction as to increase the tension of the belt.

Other features and objects of the present invention will become apparent from the following description taken with reference to the accompanying drawings, in which:

FIG. 10 is a sectional view of the fourth embodiment;

FIG. 11 is a sectional view taken along line XI—XI of FIG. 10; and

Figure 1:
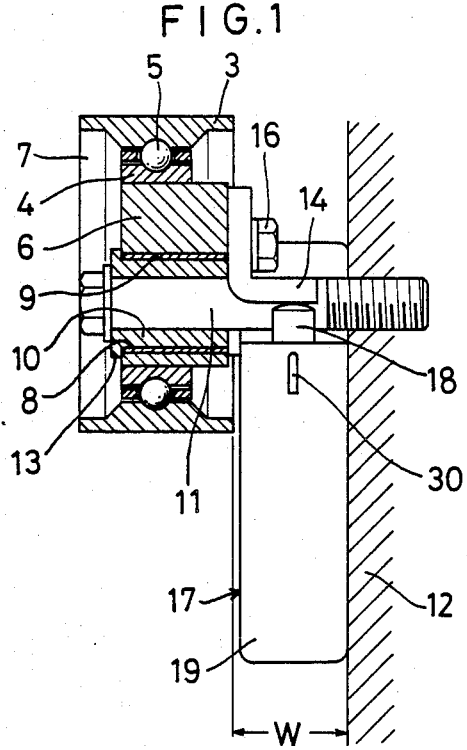
FIG. 1 is a sectional view of the first embodiment of the present invention.
Figure 2:
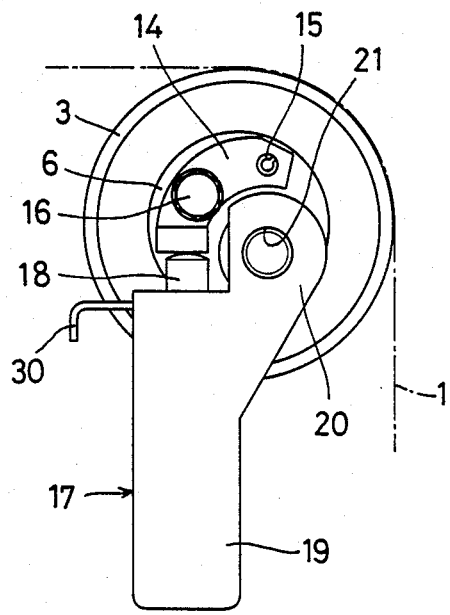
FIG. 2 is a front view of the same.

As shown in FIGS. 1 and 2, the belt autotensioner in the first embodiment has a rolling bearing 7 comprising an inner ring 4, an outer ring or tension pulley 3 rotatably mounted about the inner ring 4 and adapted to be pressed against a belt 1 to give tension thereto, and a plurality of balls 5 interposed between the inner ring 4 and the outer ring 3. An eccentric shaft 6 is press-fitted into the inner ring 4 so as to be integral therewith and is formed with a hole 8 having its axis eccentric from that of the rolling bearing 7. Into the eccentric hole 8, a slide bearing 9 is press-fitted, which in turn has a sleeve 10 extending therethrough with a small play left therebetween so as to rotatably support the eccentric shaft 6. A fixing bolt 11 extends through the sleeve 10 and has its one end fixed to an automobile engine body 12. The sleeve 10 may be integral with the fixing bolt 11. It is formed at its one end with a flange 13 which abuts the end face of the eccentric shaft 6 to hold it in position.

Figure 3:
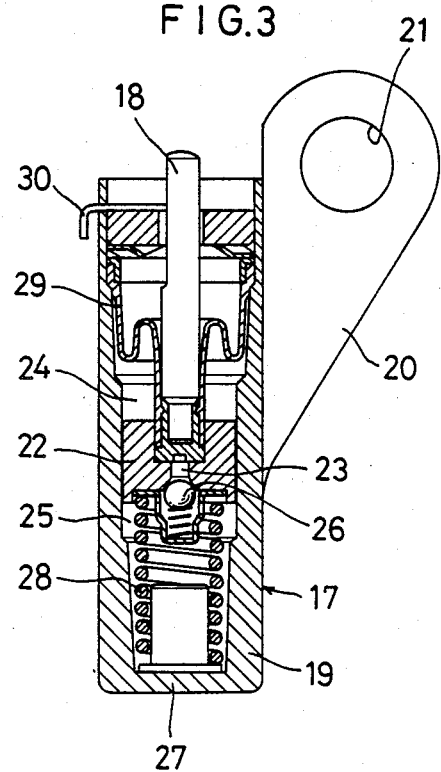
FIG. 3 is a sectional view of the actuator of the same.

A stopper 14 in the shape of a half-moon is fixed to the other end face of the eccentric shaft 6 by means of a spring pin 15 and a bolt 16 so as to abut a push rod 18 of a direct acting actuator 17. The stopper 14 may be integral with the eccentric shaft 6. The actuator 17 may be of a hydraulic type as shown in FIG. 3 or of any other type. It is provided on the outer periphery of its cylinder 19 with a mounting portion 20 formed with a hole 21 to receive the fixing bolt 11.

Now referring to FIG. 3, the direct acting actuator 17 comprises the cylinder 19, a piston 22 slidably mounted in the cylinder 19 and the push rod 18 held in engagement with the piston 22. The cylinder 19 is formed with chambers 24 and 25 separated by the piston 22. They communicate with each other through a channel 23 formed in the piston 22. In the chamber 25, there are provided a check valve 26 near the end face of the piston 22 and a spring 28 for controlling the tension of the belt 1. The spring 28 extends between the end face of the piston 22 and the bottom 27 of the cylinder 19. A diaphragm seal 29 is provided to prevent the leakage of a hydraulic oil in the cylinder 19. A set pin 30 extends through the wall of the cylinder 19 and in engagement with the push rod 18 to lock it in a predetermined position.

Figure 4:
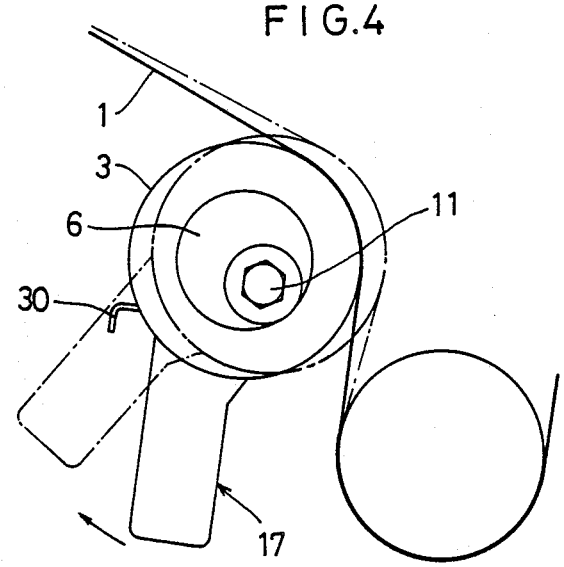
FIG. 4 is a schematic view of the same showing how it is mounted.

Next, with reference to FIG. 4, it shall be described how the autotensioner in this embodiment is mounted on an automobile engine. The fixing bolt 11 is put through the hole 8 in the eccentric shaft 6 and the hole 21 in the mounting portion 20 of the actuator 17 and then is screwed into the engine body 12 to tighten them together so lightly that the actuator 17 will be pivotable about the bolt 11. The belt 1 is put around the tension pulley 2 and the actuator 17 is pivoted in the direction of arrow to push the tension pulley 2 through its push rod 18 locked in position by the set pin 30 and the stopper 14 until it moves to the position shown by dotted line. In this state, the fixing bolt 11 is tightened up and the set pin 30 is pulled out, thus allowing the push rod 18 to move to a position where the bias of the tension control spring 28 (FIG. 3) balances with the tension of the belt 1.

Figure 5:
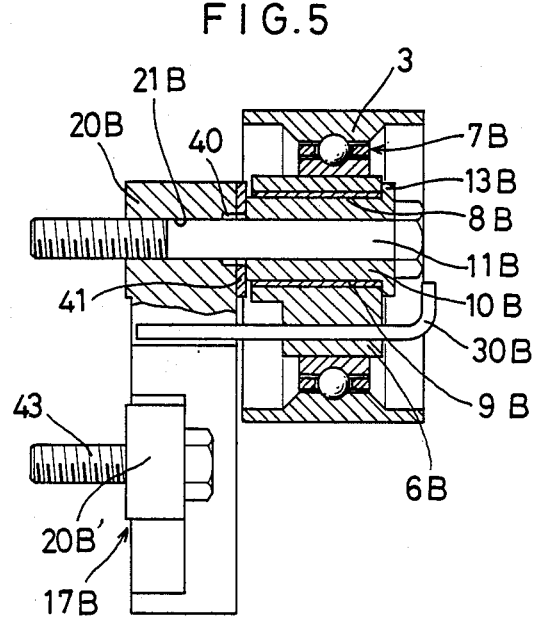
FIG. 5 is a sectional view of the second embodiment.
Figure 6:
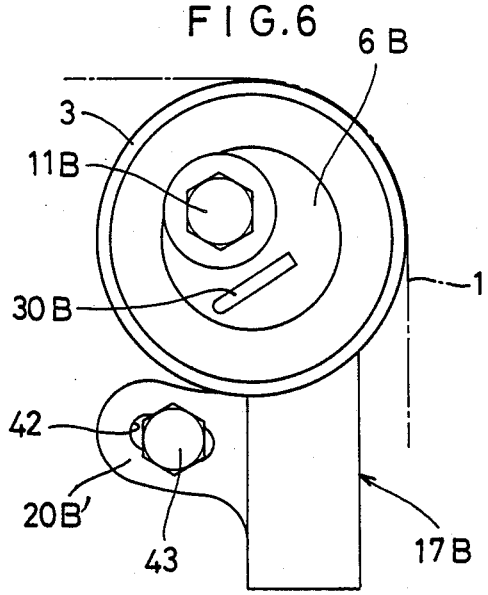
FIG. 6 is a front view of the same.
Figure 7:
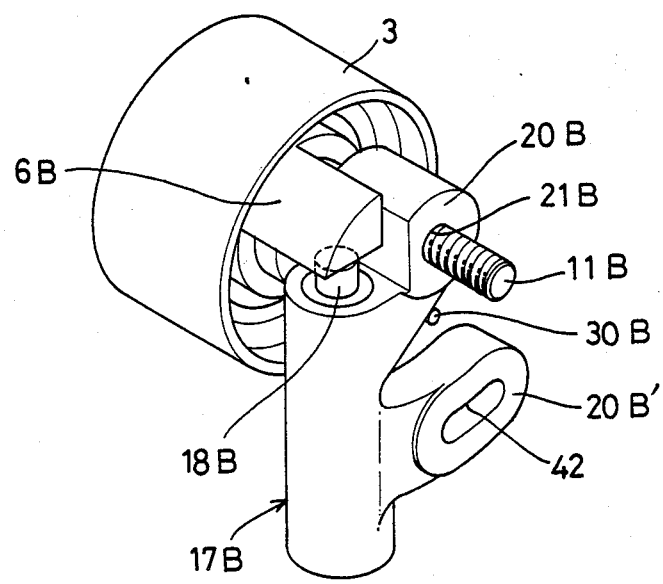
FIG. 7 is a perspective view of the same.

FIGS. 5 to 7 show the second embodiment in which a tension pulley 2B is rotatably mounted on a rolling bearing 7B to give tension to the belt 1. In the rolling bearing 7B is fitted an eccentric shaft 6B formed with an eccentric hole 8B as with the first embodiment. In the hole 8B, a sleeve 10B is rotatably mounted through a slide bearing 9B. The sleeve 10B is formed with a flange 13B for holding the eccentric shaft 6B in position and a protrusion 40 adapted to be press-fitted in a hole 21B formed in the mounting portion 20B of a direct acting actuator 17B. The sleeve 10B and the actuator 17B are fixedly mounted to the engine body (not shown) by means of a fixing bolt 11B. Numeral 41 designates a thrust washer interposed between the sleeve 10B and a mounting portion 20B. A set pin 30B is put through the eccentric shaft 6B and kept in engagement with a push rod 18B slidably mounted in the actuator 17B to temporarily hold it in a locked position.

The actuator 17B is further provided with a mounting portion 20B' formed with an elongated hole 42 into which a bolt 43 is adapted to be inserted. By tightening the bolt 43, the actuator is rigidly secured to the engine body.

According to the present invention, the tension pulley can be readily set to a desired initial position without the necessity of any special mechanism.

The autotensioner according to the present invention is formed of a small number of parts and can be made in one unit. Thus, it is easy to handle and mount on the engine body.

However, the autotensioners in the first and second embodiments might encounter a problem that the actuator 17 or 17B cannot be put between the engine body 12 and the tension pulley 2 if the width w therebetween (FIG. 1) is not sufficiently large. This is because the tension control spring 28 is mounted in the cylinder 19 (FIG. 3). It is required to have a bias of 5-15 Kgf to give a sufficient tension to the belt 1 and thus it has to be sufficiently large in size. Naturally, the cylinder 19 accommodating the spring 28 has to be correspondingly large in diameter.

In the third and fourth embodiments, an improved tension control spring is provided which is free of the above objection.

Figure 8:
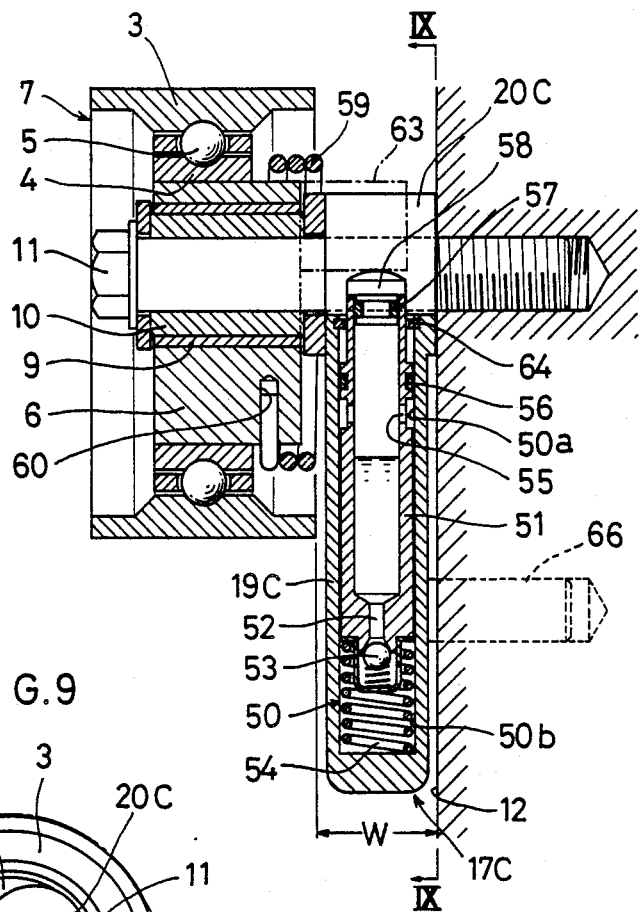
FIG. 8 is a sectional view of the third embodiment.
Figure 9:
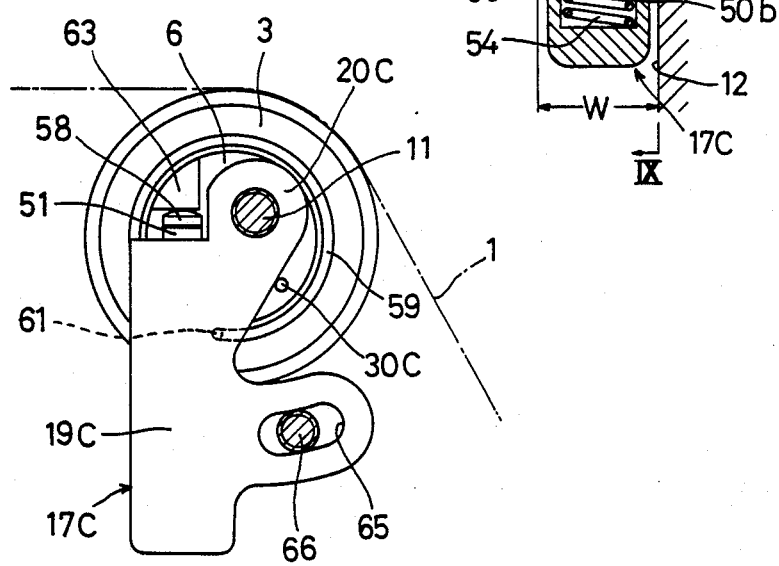
FIG. 9 is a sectional view taken along line IX—IX of FIG. 8.
Figure 12:
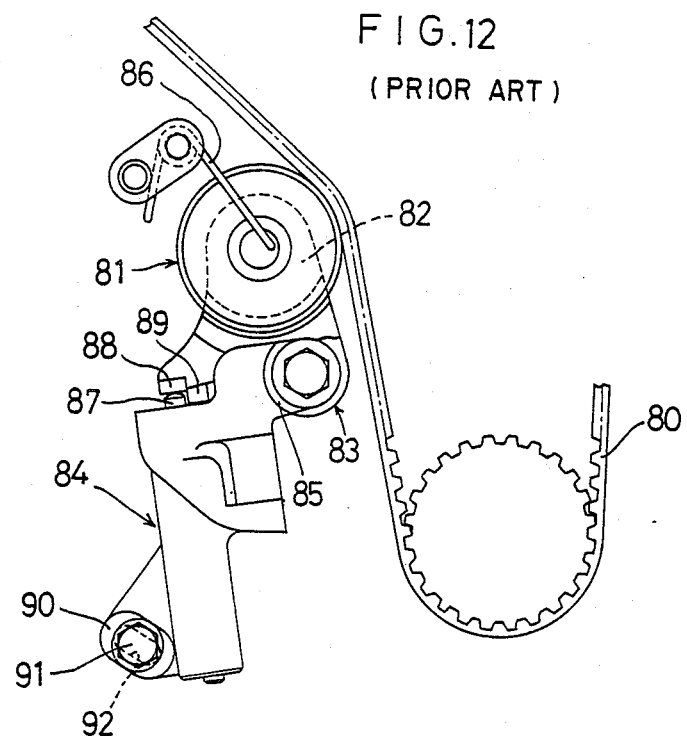
FIG. 12 is a front view of a prior art belt autotensioner.

FIGS. 8 and 9 show the third embodiment in which, as with the first embodiment, the outer ring or tension pulley 3 is rotatably mounted around the eccentric shaft 6 through the balls 5 and the inner ring 4 of the rolling bearing 7 and the fixing bolt 11 is put through the hole in the eccentric shaft 6 through the slide bearing 9 and the sleeve 10.

The fixing bolt 11 further extends through a mounting portion 20c formed on a cylinder 19C of an actuator 17C and screwed into the engine body 12.

In contrast to the first and second embodiments in which the piston and the push rod are provided separately, they are integrally formed as the plunger 51 in this embodiment.

The cylinder 19C is formed with a chamber 50 in which a plunger or piston 51 is slidably mounted. The plunger 51 is a hollow cylinder and has its lower half portion in sliding contact with the inner periphery of the cylinder 19C. The chamber 50 is separated by the plunger 51 into an upper chamber 50a and a lower chamber 50b. A channel 52 is formed through the bottom wall of the plunger 51 to bring its interior into communication with the lower chamber 50b. A check valve 53 is provided at the bottom opening of the channel 52. A coil spring 54 is mounted between the bottom end of the plunger 51 and the bottom of the chamber 50 to bias the plunger upwardly.

The plunger 51 is formed in its peripheral wall above the contact area with the cylinder 19C with a hole 55 communicating its interior with the upper chamber 50a and has an O-ring 56 fitted around its outer periphery above the hole 55. A cap 58 with an O-ring 57 is loosely put on top of the plunger 51 to allow air to pass therethrough.

The cap 58 may be formed with a venting hole to adjust the inner pressure.

A torsion coil spring 59 is mounted around the inner end portion of the eccentric shaft 6 and has its one end engaged in a hole 60 formed in the eccentric shaft 6 and the other end engaged in a hole 61 formed in the cylinder 19C (FIG. 9).

The plunger 51 has its protruding end in abutment with a projection 63 formed on the inner end face of the eccentric shaft 6.

Other parts numbered in the drawings are a stopper ring 64, an actuator fixing bolt 66, an elongated hole 65 for the bolt 66 and a set pin 30C.

Now the operation of the autotensioner of the third embodiment will be described. As the tension of the belt 1 increases, the tension pulley 2 will pivot about the fixing bolt 11 to push in the plunger 51. A hydraulic oil in the lower chamber 50b will flow up into the upper chamber 50a through a gap formed between the plunger 51 and the inner periphery of the cylinder 19C to buffer the downward movement of the plunger 51. The hydraulic oil having flown into the upper chamber 50a will then flow into the hollow space in the plunger 51 through the hole 55. The downward storke of the plunger 51 will stop where the tension of the belt 1 balances with the bias of the torsion coil spring 59. The bias of the coil spring 54 should be set to such a small value as to scarcely affect the balance therebetween. The air in the plunger 51 will be expelled through a gap formed around the O-ring 57 of the cap 58 as the hydraulic oil flows into the plunger.

On the other hand, when the tension of the belt begins to decrease, the tension pulley 2 will move in the opposite direction to the foregoing and stop when the bias of the torsion coil spring 59 decreases to such a point as to balance with the tension of the belt 1. As the tension pulley 2 moves in this direction, the plunger 51 will be pushed out by the coil spring 54 while keeping its protruing end in contact with the protrusion 63. In this state, the check valve 53 is in such a position as to open the channel 52, thus allowing the hydraulic oil in the plunger 51 to return to the lower chamber 50b.

FIGS. 10 and 11 show the fourth embodiment in which the tension pulley 2 is supported on a bolt 11D which is in threaded engagement with the mounting portion 20D of the cylinder 19D. The cylinder is in turn mounted on the engine body 12 by means of a fixing bolt 70 and another bolt 66 put through the elongated hole 65 so that the tension pulley 2 as well as the cylinder 19D can pivot about the fixing bolt 70. Otherwise this embodiment is the same in structure and function as the third embodiment.

With the autotensioners in the third and fourth embodiments, the tension control spring for the belt is in the form of a torsion coil spring mounted around the eccentric ring of the tension pulley with its one end engaged in the eccentric shaft and the other end engaged in the damper cylinder. This will make it possible to reduce the diameter of the cylinder to minimum, so that it can be mounted between the tension pulley and the the engine body even if the width w therebetween is rather small. Also, by providing the tension control spring outside the actuator, the length of the plunger can be increased. This will assure a sufficient leak-down time even if the plunger has a small diameter, thus improving the cushioning effect.

What is claimed is:

1. A belt autotensioner for imparting a desired tension of a belt, comprising a rolling bearing including an outer ring in the form of a tension pulley adapted to be pressed against said belt, an inner ring rotatably mounted in said outer ring and a plurality of rolling elements interposed between said outer ring and said inner ring, an eccentric shaft fixedly mounted in said inner ring and formed with a hole arranged eccentrically with respect to the axis of said rolling bearing, a stopper fixedly mounted on one end face of said eccentric shaft, a direct acting actuator for dampening the pivotal motion of the eccentric shaft when the tension of the belt is increasing, said actuator having a damper cylinder and an urging means slidably mounted therein, said urging means having one end thereof protruding from said cylinder and in abutment with said stopper, a bolt means extending through said hole in said eccentric shaft and said actuator so as to pivotally support said eccentric shaft, and a spring means for biasing said eccentric shaft to pivot it in such a direction as to increase the tension of said belt.

2. A belt autotensioner as claimed in claim 1, wherein said spring means is a torsion coil spring mounted around said eccentric shaft with one end thereof engaged in the outer periphery of said eccentric shaft and the other end thereof engaged in said damper cylinder of said actuator.

* * * * *